(12) United States Patent
Hugot et al.

(10) Patent No.: US 9,221,101 B2
(45) Date of Patent: Dec. 29, 2015

(54) PROCESS FOR LOCAL REPAIR OF A DAMAGED THERMOMECHANICAL PART AND PART THUS PRODUCED, IN PARTICULAR A TURBINE PART

(75) Inventors: Juliette Hugot, Jaunay-Clan (FR); Justine Menuey, Annecy (FR)

(73) Assignee: SNECMA, Paris (FR)

( * ) Notice: Subject to any disclaimer, the term of this patent is extended or adjusted under 35 U.S.C. 154(b) by 146 days.

(21) Appl. No.: 14/003,453

(22) PCT Filed: Mar. 6, 2012

(86) PCT No.: PCT/FR2012/050459
§ 371 (c)(1),
(2), (4) Date: Sep. 6, 2013

(87) PCT Pub. No.: WO2012/120231
PCT Pub. Date: Sep. 13, 2012

(65) Prior Publication Data
US 2013/0344347 A1   Dec. 26, 2013

(30) Foreign Application Priority Data
Mar. 7, 2011  (FR) ...................................... 11 51832

(51) Int. Cl.
*B22F 7/08* (2006.01)
*B22F 7/04* (2006.01)
(Continued)

(52) U.S. Cl.
CPC . *B22F 7/04* (2013.01); *B22F 3/105* (2013.01); *B22F 5/009* (2013.01); *B22F 5/04* (2013.01); *B22F 7/064* (2013.01); *B22F 7/08* (2013.01); *B23P 6/007* (2013.01); *B22F 2003/1051* (2013.01); *B22F 2999/00* (2013.01); *Y10T 29/49318* (2015.01); *Y10T 428/12021* (2015.01)

(58) Field of Classification Search
CPC ....... Y10T 29/49318; B22F 7/04; B22F 5/04; B22F 3/105; B22F 5/009; B22F 7/064; B22F 2003/1051; B23P 6/007
See application file for complete search history.

(56) References Cited

U.S. PATENT DOCUMENTS 6,384,365 B1   5/2002  Seth et al.

FOREIGN PATENT DOCUMENTS

| FR | 2 932 496 | 12/2009 |
|---|---|---|
| FR | 2 941 965 | 8/2010 |
| JP | 2003 342617 | 12/2003 |

OTHER PUBLICATIONS

Daniel Monceau et al. (Thermal Barrier Systems and Multi-Layered Coatings Fabricated by Spark Plasma Sintering for the Protection of Ni-Base Superalloys, 2010, Materials Science Forum, pp. 654-656.*

(Continued)

*Primary Examiner* — Sarang Afzali
*Assistant Examiner* — Ruth G Hidalgo-Hernandez
(74) *Attorney, Agent, or Firm* — Oblon, McClelland, Maier & Neustadt, L.L.P.

(57) ABSTRACT

A process and device in production of precise three-dimensional sinters of a shape substantially close to that of an original part, using flash sintering produced by spark plasma sintering (SPS) technology. A mold is produced in a die of an enclosure for SPS flash sintering, the mold being shaped as an impression of the original part. The following are deposited in successive layers in the mold: a layer based on a superalloy powder, a metallic protection layer, and a thermal barrier layer. In a sintering, pressurization is initiated and a pulsed current passes through, producing a rapid rise in temperature in accordance with a flash sintering cycle whose temperature, pressure, and duration are regulated, with at least one temperature plateau and one pressure plateau. The layer of superalloy forms, by diffusion, during the sintering, a bonding continuum of material with the part to be repaired.

8 Claims, 2 Drawing Sheets

(51) Int. Cl.
  *B22F 3/105*   (2006.01)
  *B22F 5/00*    (2006.01)
  *B22F 5/04*    (2006.01)
  *B22F 7/06*    (2006.01)
  *B23P 6/00*    (2006.01)

(56) References Cited

OTHER PUBLICATIONS

Schmidt et al. (J. Schmidt, T. Weißgärber, T. Schubert, B. Kieback, Spark Plasma Sintering of Intermetallics and Metal Matrix Composites, Proceedings, EuroPM 2005, Prag, Tschechien, 1 (2005), pp. 93-98.*

J. Song et al., "Simultaneous synthesis by spark plasma sintering of a thermal barrier coating system with a NiCrAlY bond coat", Surface & Coatings Technology, 205 (2010), pp. 1241-1244.*

Jin et al., "TiB2/AlN/Cu Functionally Graded Materials (FGMs) Fabricated by Spark Plasma Sintering (SPS) Method", Key Engineering Materials, 280-283 (2005), pp. 1881-1884.*

Oquab et al., "Oxidation resistant aluminized MCrAlY coating prepared by Sparks Plasma Sintering (SPS)", Advanced Engineering Materials, 9 (2007), pp. 413-417.*

International Search Report Issued Jun. 29, 2012 in PCT/FR12/050459 Filed Mar. 6, 2012.

* cited by examiner

PROCESS FOR LOCAL REPAIR OF A DAMAGED THERMOMECHANICAL PART AND PART THUS PRODUCED, IN PARTICULAR A TURBINE PART

TECHNICAL FIELD

The invention relates to a process for local repair of a damaged thermomechanical part that has been subjected to heavy stresses during use, for example by corrosion, erosion or wear. It also relates to parts made in accordance with this process and applies more particularly, but not exclusively, to turbine parts.

The field of the invention is that of refractory materials in a nickel-based superalloy. These materials are able to constitute thermomechanical parts, in particular gas turbine parts in the field of aerospace, such as mobile straightening or distributor vanes, their platform, base or other equipment, that are particularly resistant to corrosion and oxidation.

However, these parts are subjected to pressure and temperature stresses such that material is lost, which necessitates repair by the addition of material. This repair consists of returning the part to its initial dimensions while retaining a constituent material that is of the same type or of a chemically similar composition.

PRIOR ART

For this, it is known to make local repairs by arc welding when the repair is restricted to areas of the part that are non-critical and limited in extent.

For larger or more critical repairs, one solution consists of adding material, in solid form, in the area to be repaired. The material is then made available as preforms cut from plate or strip, made from a blend of superalloy powder and brazing powder raised to a high temperature in a specially-adapted furnace. This blend is thus sintered because of the low melting point eutectics produced by the blend of powders. The sinters obtained in this way are then placed alongside the areas of the part that are to be repaired, which have already been cleaned, and the whole is brought up to temperature. Diffusion brazing processes then occur and the sinter is brazed onto the surface of the part.

In this method, the sintered sheet is cut using a water jet to produce plane two-dimensional (2D) preforms. After brazing, the part is shaped by machining the plane areas in order to restore it to a geometry close to the original geometry and thus confer the appropriate aerodynamic properties.

This process involves the presence of brazing powder, and thus of melting components distributed throughout the entire thickness of the sinter. However, the presence of melting components has a negative impact on thermomechanical performance.

In addition, it allows only two-dimensional sintered preforms to be produced, with a constant thickness regardless of the zone of the sinter. However, in the more recent versions of the parts for which it is intended, it would be advantageous to have sinters with a thickness that varies in certain zones. The current method does not allow such precision.

Furthermore, the creation of the sinter occurs via several successive steps, involving a not inconsiderable manufacturing cost. In addition, a large part of the material is lost, the sinters being produced from sheet of which the greater part is thrown away.

DESCRIPTION OF THE INVENTION

The invention aims to remedy the disadvantages of the prior art by proposing the simple, rapid and efficient production of precise three-dimensional (3D) sinters of a shape substantially resembling that of the original part. To do this, the invention uses a flash sintering produced by spark plasma sintering (SPS) technology.

SPS technology combines, simultaneously, the application of a high uniaxial pressure and pulses of high-intensity direct current, causing an almost immediate and uniform rise in temperature. This technology is known in the field of powder metallurgy which enables, via agglomeration and compaction, metal parts or metal oxides to be produced from powders. In particular, the use of SPS flash technology makes it possible to manufacture parts with particular microstructures that can be controlled.

More specifically, the subject of the present invention is a process for local repair of a thermomechanical part made of a superalloy. The process consists, in a preparatory step, of producing a mould in a die of an enclosure for SPS flash-sintering, the mould being shaped as an impression of at least a repair portion of the damaged part, of introducing into the mould at least one layer of brazing powder and at least one layer of superalloy-based powder constituting a multilayer whole. Then, in a sintering step, of pressurising and of initiating a passage of pulsed current producing a rapid rise in temperature in accordance with a flash sintering cycle whose temperature, pressure and duration are regulated, with at least one temperature plateau and one pressure plateau, so that a bond of material with the part can subsequently be produced by diffusion. This sintering step produces a preform with composition gradients in the multilayer whole, with a brazing face that can be joined to the part to be repaired and a superalloy material (6s) appearing on the surface of the preform.

Advantageously, the temperature, pressure and duration of the flash sintering cycle are regulated, with a rise in temperature of at least 600° C./min, a temperature plateau approximately in the range between 1000° C. and 2000° C. and a pressure plateau approximately in the range between 10 and 100 Mpa.

According to one embodiment, the mould has a shape that corresponds to an impression of the entire original part. During the sintering step, the layer of superalloy forms, by diffusion, a bonding continuum of material with the part to be repaired.

In a subsequent brazing step, the brazing face of the preform made in this way can be placed in contact with the area of the part to be repaired. Then, by heating the preform and the part placed alongside in an appropriate furnace to a temperature at least equal to the melting temperature of the brazing alloy, the brazing face is bonded by diffusion of the melting elements of the brazing alloy in the part to be repaired. The mechanical weakening of the part in the repaired area is thus noticeably reduced or even eliminated.

In particular embodiments:
- metallic protection and thermal barrier layers are deposited on the layer of superalloy during the preparation phase;
- the metallic protection layer consists of at least one sheet die composed of Ni, Pt, Hf, Y, Zr, Al, Si, Cu, Ag and/or Au, and/or of Ni—Al, Ni—Pt—Al and/or Ni—Al—Zr compositions.
- the thermal barrier consists of 6-8% wt yttria-stabilised zirconia (thermal barrier composition $ZrO_2$-6-8$Y_2O_3$).

The invention also relates to a thermomechanical part made of superalloy, in particular a turbine part, repaired according to the above process via flash sintering. The part is then bonded, by diffusion of material, to the part to be repaired.

BRIEF DESCRIPTION OF THE DRAWINGS

Other features and advantages of the invention will become apparent on reading the description that follows and which relates to an embodiment, with reference to the appended drawings, in which.

DETAILED DESCRIPTION

Figure 1:
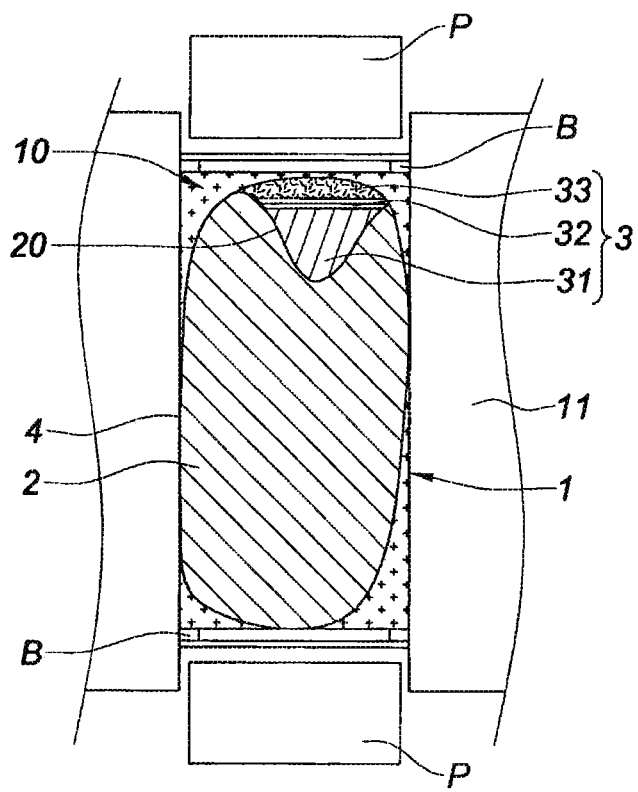
FIG. 1 shows a diagrammatic view in cross-section of an example of an assembly of layers in an SPS die mould shaped as an impression corresponding to the original part.

FIG. 1 shows a diagrammatic view in partial vertical cross-section of a mould 1 formed in a chamber 10 of a hollow cylindrical graphite die 11 of an SPS enclosure (not shown). Electrical voltage terminals B and compression pistons P are adjusted to allow pressurisation and the passage of a pulsed current through the mould in accordance with flash sintering cycles.

This mould 1 is shaped as an impression corresponding to the original part made of a superalloy. The damaged part 2 is introduced into this mould after cleaning of the outer surface, in particular of the face 20 from which a portion of the part is missing or is eroded, corroded or oxidated. On this face 20, an assembly 3 of successive layers or strata of materials is deposited: a layer of superalloy powder 31, a stratum of protective metal 32, consisting of sheets of platinum and aluminium, and a thermal barrier 33, made from a ceramic powder of zirconia stabilised with yttria, formula $ZrO_2Y_2O_3$.

Following the geometric shape of the part to be repaired, the layers or strata can be deposited on the damaged part 2 before they are integrated into the mould 1 or, alternatively, the assembly 3 can be injected into this mould via nozzles. The part and the assembly are disposed in a graphite jacket 4 which is itself placed in the mould to enable localised pressure to be applied. These different methods of forming the multilayer assembly 3 on the part 1 are within the competence of a person skilled in the art.

During the flash sintering operation, the cycles of adjusting the temperature and pressure follow charts programmed in accordance with predetermined values for electrical voltage and pressure. The programmes provide for temperature plateaux that can go up to 2000° C. with an electrical current passing through the mould that can reach 8000 A.

Figure 2:
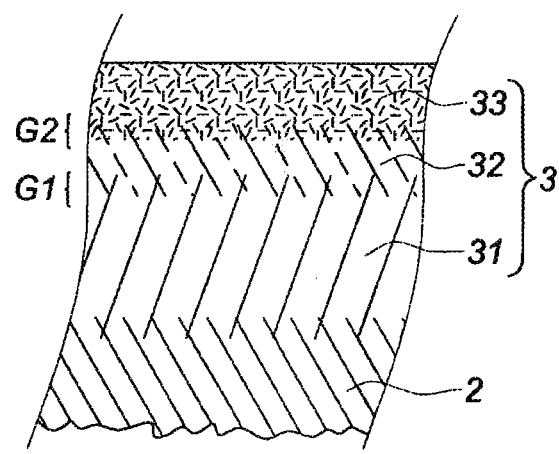
FIG. 2 shows a partial view in diagrammatic cross-section of the same assembly after flash sintering.

The current imposed enables a very rapid rise in temperature, for example of the order of 600° C./min or more. This speed prevents the grains enlarging during sintering and is thus particularly recommended for the synthesis of nanomaterials. In addition, this speed also allows diffusion to take place evenly: as shown in FIG. 2, the development of the multilayer assembly 3 is maintained while promoting the appearance of composition gradients G1 and G2 at the interface of the layers and strata 31-32-33, and also of a bonding continuum of material between the stratum of sintered superalloy 31 and the part to be repaired 2.

Figure 3:
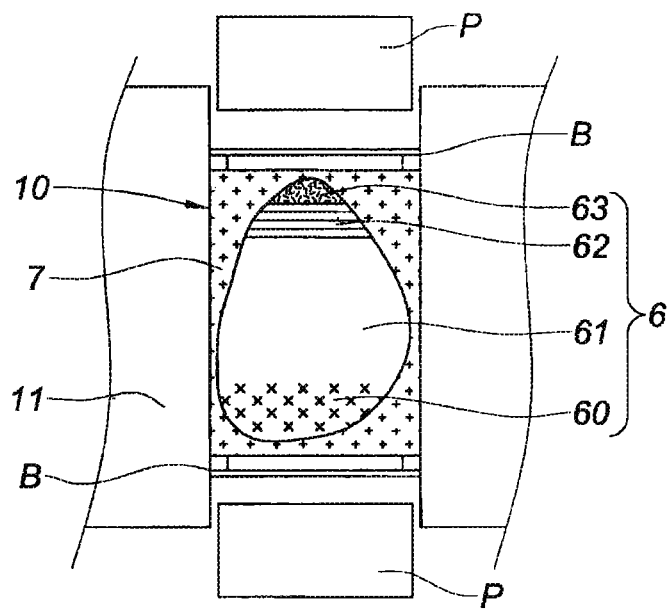
FIG. 3 shows a diagrammatic view in cross section of an example of an assembly of layers in an SPS die mould shaped as an impression corresponding to the portion of the part to be repaired.

With reference to FIG. 3, the view in diagrammatic cross-section shows another example of an assembly of layers 6 in a mould 7 formed in the chamber 10 of an SPS die 11. In this example, the mould 7 has the form of an impression corresponding to the repair portion being added to the damaged part in order to restore the original shape of the part.

According to the methods described above, the impression is filled with successive deposits of layers and strata forming the assembly 6 or multilayer whole: a layer of brazing powder 60—able to match the face of the part to be repaired—a layer of superalloy powder 61, a protective stratum 62 consisting of sheets of Ni—Al—Zr composites and a thermal barrier 63, formed from a ceramic powder of yttria-stabilised zirconia, formula $ZrO_2Y_2O_3$, and doped with gadolinium oxide $Gd_2O_3$.

Figure 4:
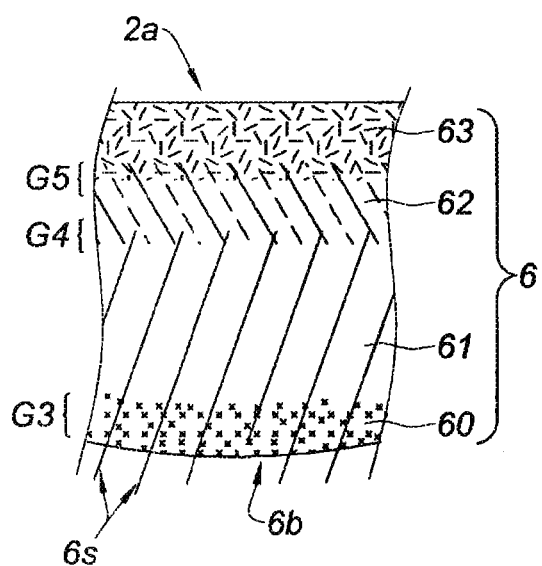
FIG. 4 is a view in partial diagrammatic cross-section of this assembly after flash sintering.

With reference to FIG. 4, the sintering step carried out in the conditions specified above makes it possible to obtain a preform 2a with composition gradients G3, G4 and G5 in the multilayer whole 6, between the layers or strata 60-61-62-63. The sintered brazing layer 60 has an external face 6b that can be joined to the damaged face of the part to be repaired and some superalloy material 6s appears on the surface of the preform 2a, in the brazing face 6b.

Figure 5:
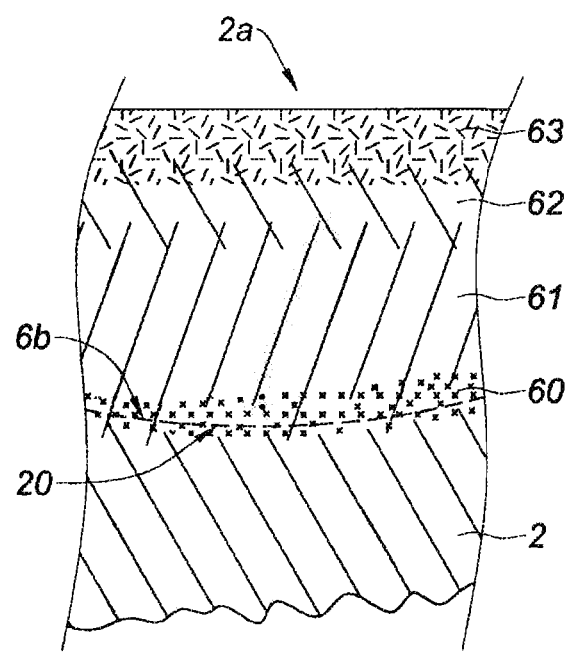
FIG. 5 is a view in diagrammatic cross-section of this assembly after brazing onto the part to be repaired.

In a subsequent brazing step shown in FIG. 5, the brazing face 6b of the preform 2a is placed in contact with the complementary zone of the part 2 to be repaired, namely the face 20. Then, the preform 2a and the part placed alongside 2 are heated in an appropriate furnace to a temperature at least equal to the melting temperature of the brazing alloy, for example approximately 700° C. for a silver-based brazing alloy. The brazing face 6b then bonds by diffusion of the melting elements of the brazing alloy in the part to be repaired 2 through its face 20.

The invention is not restricted to the examples described and shown. For example, it is possible to deposit several initial layers of chemically and thermally compatible ceramic materials. Furthermore, the metallic protection layer and the thermal barrier layer can be added later in a subsequent depositing step over the whole part once it has been reconstituted. In this case, the protective layer and the heat resistance layer are advantageously stripped from the surface of the damaged part beforehand, and sintering is performed without these layers. The layers are then deposited and joined by sintering over the whole of the reconstituted part.

The invention claimed is:

1. A process for local repair of a thermomechanical part of a superalloy, comprising:
    producing a mold in a die of an enclosure for spark plasma sintering (SPS) flash-sintering, the mold being shaped as an impression of at least a repair portion of the part;
    introducing into the mold a layer of brazing powder and at least one layer of a superalloy-based powder constituting a multilayer whole;
    then, in a sintering, pressurizing and initiating a passage of pulsed current producing a rapid rise in temperature in accordance with a flash sintering cycle whose temperature, pressure, and duration are regulated, with at least one temperature plateau and one pressure plateau, so that a bond of material with the part can subsequently be produced by diffusion, the sintering producing a preform with composition gradients in the multilayer whole, with a brazing face that can be joined to be in direct contact to the part and a superalloy material appearing on the surface of the preform.

2. The repair process according to claim 1, in which the temperature, pressure, and duration of the flash sintering cycle are regulated, with a rise in temperature of at least 600° C./min, a temperature plateau substantially in a range between 1000° C. and 2000° C., and a pressure plateau substantially in a range between 10 and 100 Mpa.

3. The repair process according to claim 1, in which the mold has a shape that corresponds to an impression of an entire original part, and the layer of superalloy forms, by diffusion, a bonding continuum of material with the part to be repaired.

4. The repair process according to claim 1, in which a metallic protection layer and a thermal barrier layer are deposited on the layer of superalloy during producing the mold.

5. The repair process according to claim 3, in which, in a subsequent brazing, the brazing face of the preform is placed in contact with an area of the part to be repaired, then, by heating the preform and the part placed alongside in an appropriate furnace to a temperature at least equal to the melting temperature of the brazing alloy, the brazing face is bonded by diffusion of the melting elements of the brazing alloy in the part.

6. The repair process according to claim 4, in which the metallic protection layer consists of at least one sheet die composed of Ni, Pt, Hf, Y, Si, Cu, Ag and/or Au, and/or of Ni—Al, Ni—Pt—Al and/or Ni—Al—Zr compositions.

7. The repair process according to claim 4, in which the thermal barrier consists of yttria-stabilized zirconia.

8. A thermomechanical part or a turbine part made of a superalloy repaired according to the repair process of claim 1 via flash sintering, in which the part includes a bond with the part formed by the multilayer whole with composition gradients, obtained by diffusion of a layer of brazing powder and at least one layer of superalloy-based powder.

* * * * *